(No Model.)
L. SHUSTER, Jr.
AIR INLET FOR PLUMBING PURPOSES.
No. 503,809. Patented Aug. 22, 1893.
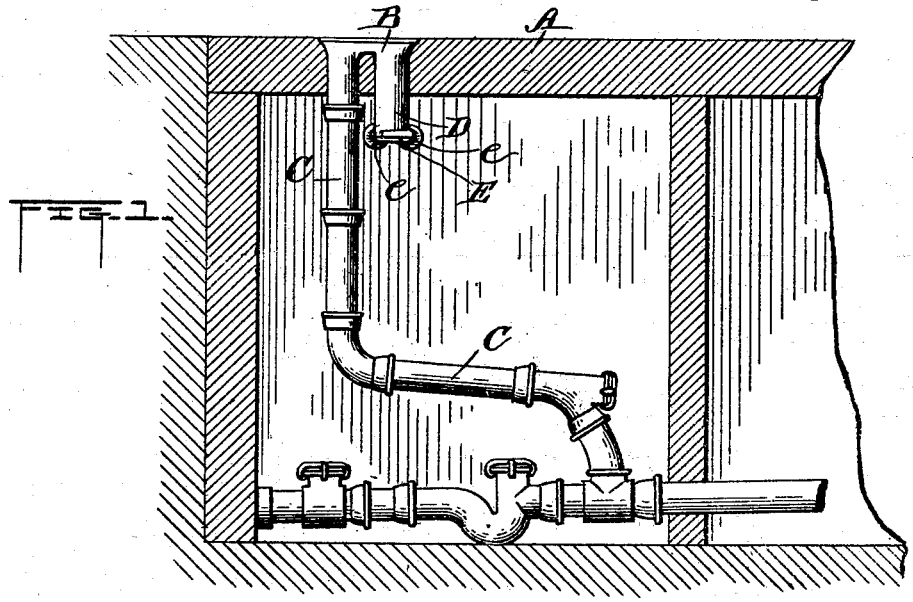
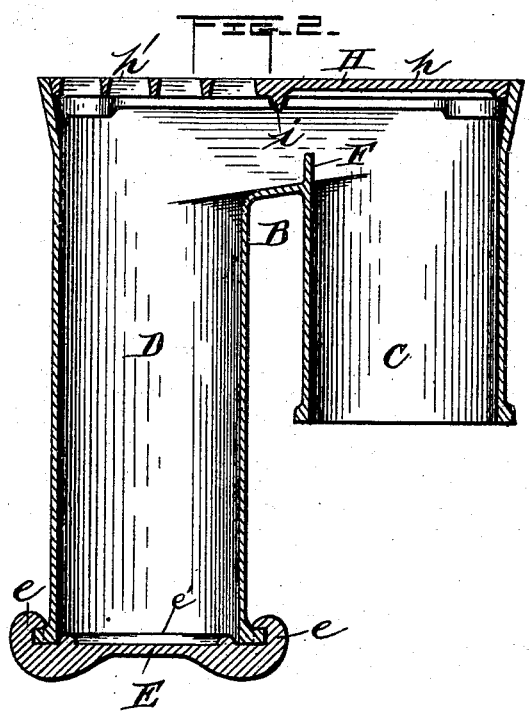
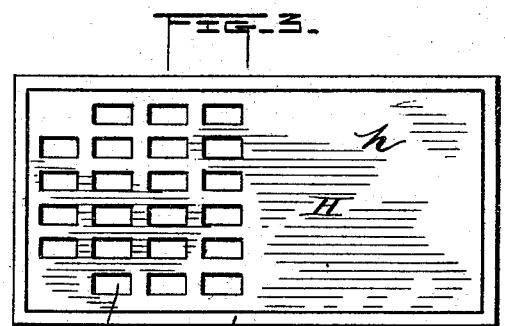
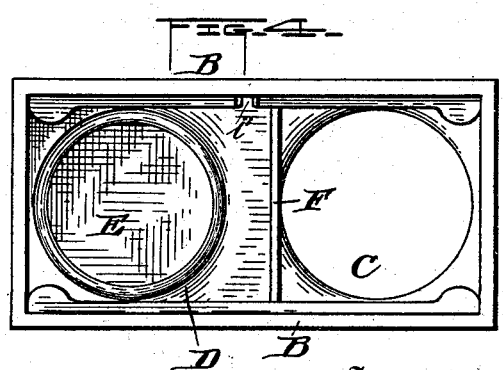
Witnesses
Severance
Fredk J. Lambert
Inventor
Lawrence Shuster Jr.
by Thos. D. Arnold
his Attorney

UNITED STATES PATENT OFFICE.

LAWRENCE SHUSTER, JR., OF PHILADELPHIA, PENNSYLVANIA.

AIR-INLET FOR PLUMBING PURPOSES.

SPECIFICATION forming part of Letters Patent No. 503,809, dated August 22, 1893.

Application filed May 24, 1892. Serial No. 434,166. (No model.)

*To all whom it may concern:*

Be it known that I, LAWRENCE SHUSTER, Jr., a citizen of the United States, residing at Philadelphia, in the county of Philadelphia and State of Pennsylvania, have invented certain new and useful Improvements in Air-Inlets for Plumbing Purposes; and I do declare the following to be a full, clear, and exact description of the invention, such as will enable others skilled in the art to which it pertains to make and use the same, reference being had to the accompanying drawings, and to the letters of reference marked thereon, which form a part of this specification.

This invention relates to improvements in air vents for plumbing purposes, and has for its object the provision of a suitable ventilating trap that is placed in the pavement at or near the curb, and consists of a frame or trap, at one end of which is a pipe or section of pipe for connection with the soil pipe, and at the other a suitable dirt receptacle or catch-all, the top of the frame or trap being provided with a suitable cover, one portion of which is plain and the other open or grate work.

The invention further consists in the novel construction and arrangement of parts of the device more particularly hereinafter described, illustrated in the drawings and pointed out in the claim hereunto appended.

Referring to the accompanying drawings, Figure 1 is a view of the trap in position in the pavement, and showing the ventilating pipe connected to the soil pipe. Fig. 2 is a vertical central section of the device. Fig. 3 is a top view of the cover, showing the construction thereof. Fig. 4 is a top view of the trap with the cover removed.

Similar letters of reference indicate corresponding parts in all the views where they occur.

Referring to the drawings by letter, A, indicates the pavement and B the trap therein, and set flush therewith as is usual. C, is the ventilating pipe leading from said trap down to and connects with the soil pipe to the rear of the water-trap therein as usual. The dirt receptacle or catch-all D, is of any suitable depth, and may be permanently closed at the lower end or provided with a door or removable bottom E. This door or bottom may be secured to the catch-all D, in any suitable manner, but I prefer the means shown in the drawings.

Secured to the under sides of the bottom E, are clamps *e*, as shown, which fit upon and are secured to cam-shaped flanges on the bottom of said tube or receptacle, as is evident. On the inner side of this bottom E is a ring or circular bead *e'* which fits inside the receptacle D as shown, for the purpose of making a tight joint between the bottom and the receptacle. This catch-all D, instead of being circular in cross section may be rectangular, or any other suitable shape, as is apparent. It is also evident that the vent pipe C, or the receptacle D, may be of any suitable or convenient size. The upper ends of the pipe C, and the receptacle D, are separated by means of a partition F, as shown. This partition is of such a height as to prevent the dirt and other débris that may enter the trap through the grating from sifting down into the ventilating pipe and into the soil pipe, and yet permit the air to pass through the grating, over and down through the ventilating pipe into the soil pipe, through said soil pipe and suitable connections to the outside of the house, thus ventilating the soil pipe. If desired this partition may extend the whole height of the space between the junction of the upper ends of the ventilating pipe and the receptacle D, and the top or cover H, of the trap. In this latter case the said partition is provided with suitable perforations to permit the passage of air through into the ventilating pipe. In the upper portion of said frame are suitable supports upon which the cover H, rests. One portion of this cover H, is made solid and perfectly plain, as shown at *h*, while the other part is grating or open work, as shown at *h'*. This open work or grating when in position fits over the receptacle or catch-all, thus allowing all the dirt and other débris sifting through said open work to fall into the catch-all, instead of into the ventilating pipe as has heretofore been the case. The dirt falling into said catch-all or receptacle can be removed at any time through the top by taking of the perforated cover H, or through the bottom by simply removing the door E. The under side of this cover H, is provided with lugs or projections *i*, on one or both sides thereof for holding it in position on the trap, and fit in corresponding notches *i'*, in the support on which the said cover H rests. It is evident that any dirt that may fall through the grating will go into the receptacle, while the air will pass over the partition F, into the ventilating pipe, thus preventing the pipes from becoming clogged by the accumulation of sticks and other débris in the soil pipe.

Having thus described my invention, what I claim, and desire to secure by Letters Patent, is—

A removable inlet or ventilating trap for house plumbing purposes consisting of a leg or portion for connection with a house soil pipe, and a catch-all or dirt receptacle, cam flanges on the lower edge thereof, a removable door or bottom for said receptacle, a circular bead or ring $e'$ on said bottom and the cam engaging lugs on said removable bottom, a partial height partition in said trap between the upper ends of the leg or pipe and catch-all, and longitudinal supports in the top of said trap for a cover, a partially grated cover resting in the top of said trap, the grated portion of said cover resting over the catch-all and the solid portion over the leg or pipe, the lug on the under side of the cover, and a notch in the cover supports engaging the lug, as set forth.

In testimony whereof I affix my signature in presence of two witnesses.

LAWRENCE SHUSTER, Jr.

Witnesses:
FREDK. J. LAMBERT,
F. EARLE VON LEER.